March 25, 1952 J. E. NOVAK 2,590,788
MOWER CUTTER BAR GUARD
Filed Jan. 26, 1949 2 SHEETS—SHEET 2
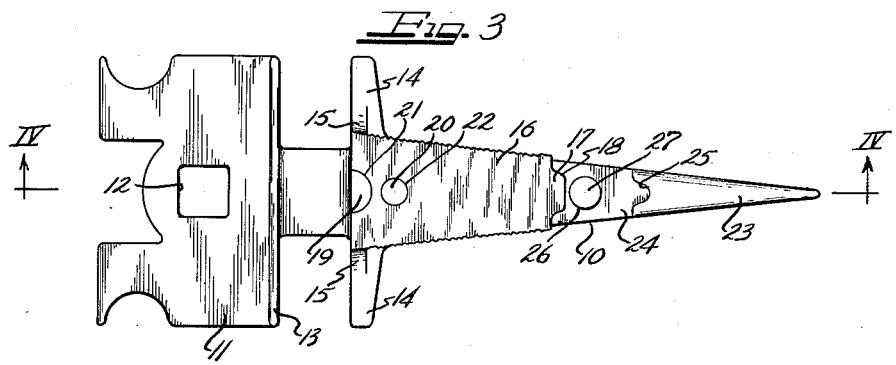
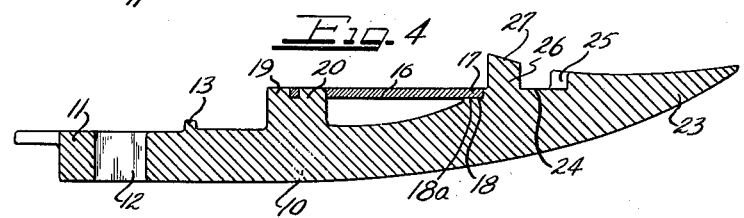
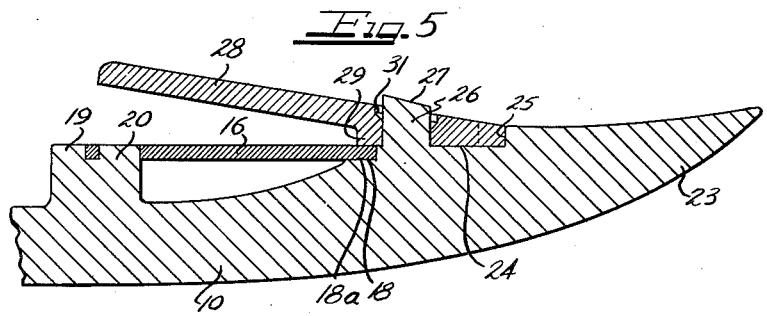
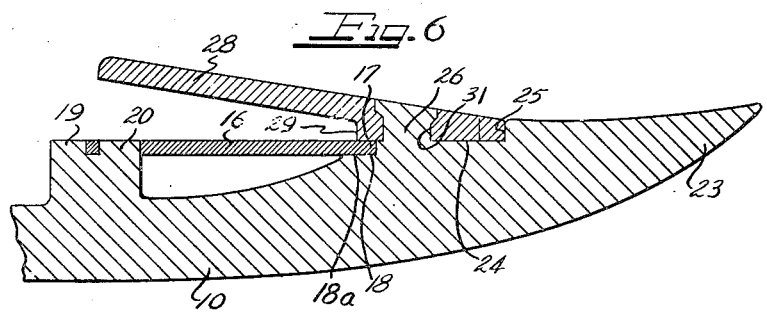
Inventor
JOSEPH E. NOVAK Patented Mar. 25, 1952

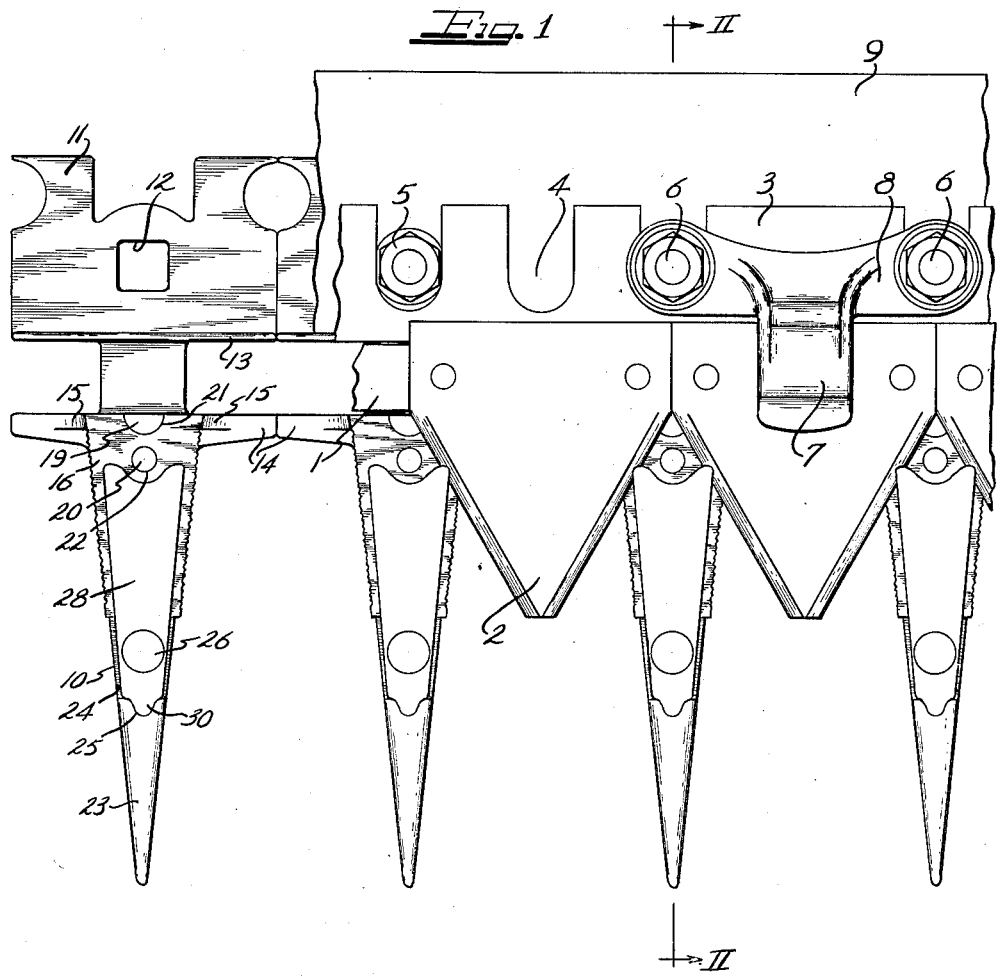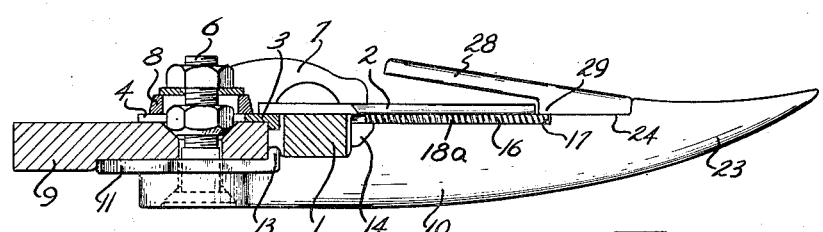

2,590,788

UNITED STATES PATENT OFFICE 2,590,788

MOWER CUTTER BAR GUARD

Joseph E. Novak, Berwyn, Ill.

Application January 26, 1949, Serial No. 72,903

8 Claims. (Cl. 56—307)

In the construction of cutter bar units for mowers and other agricultural cutter machines, considerable difficulties have been encountered in providing satisfactory guards for carrying the ledger plates or blades in proper position for co-action with the cutter blades mounted on a reciprocable cutter bar mounted adjacent the guard bar of the mower cutter bar unit.

Due to the fact that malleable iron guards are substantially impossible to obtain and since the present types of mower guards having the lips soldered thereon have proven extremely unsatisfactory this invention has been devised to provide an improved mower cutter bar guard formed with centering means for the guard lip including a stud which is adapted to be projection welded to fill a counter-sunk opening in the guard lip, thereby providing an improved method for securing the lip on a forged guard to provide an improved rigid construction obviating the difficulties heretofore encountered due to transverse shearing off of the soldered connection between the lip and the guard body in the types of guards now in use.

The present invention therefore relates to a new and useful improvement in the cutting mechanisms of cutter harvesting machines and more particularly to an improved construction and a method of assembly of the ledger plate and guard parts by providing improved centering means for the ledger plate and guard lip and permitting the lip to be projection welded into position to increase the longevity of the guard.

It is an object of this invention to provide an improved mower cutter bar guard whereby forged guards may have the lips thereof interfitting the guard bodies and projection welded in place to form rigid durable guard constructions.

It is a further object of this invention to provide a mower cutter bar guard wherein the guard body is provided with a notch for receiving one end of a guard lip, said lip having an opening therein for fitting over a guard stud which is projection welded to rigidly hold the lip in position over the guard ledger plate.

Another object of the invention is to provide an improved mower cutter bar guard wherein the guard body is provided with projections and notches to provide a plurality of aligning means for both the ledger plate and the guard lip, and wherein the guard lip is adapted to be projection welded in place.

Other and further important objects of this invention will be apparent from the disclosures in the specification and the accompanying drawings. The invention (in a preferred form) is illustrated in the drawings and hereinafter more fully described.

On the drawings:

Figure 1 is a fragmentary top plan view of a mower cutter structure including improved guards embodying the principles of this invention.

Figure 2 is a transverse sectional view taken on line II—II of Figure 1 showing the guard and other parts in elevation.

Figure 3 is a top plan view of the improved mower cutter bar guard with the lip removed and showing the ledger plate in place.

Figure 4 is a longitudinal sectional view taken on line IV—IV of Figure 3.

Figure 5 is an enlarged longitudinal central section of the nose end of the improved cutter bar guard showing the lip in position interfitting a receiving notch in the guard nose and also showing the retaining stud projecting upwardly through an opening in the lip prior to rigidly securing the lip in place.

Figure 6 is a longitudinal central section similar to Figure 5, but showing the retaining stud after it has been projection welded to rigidly secure the lip to the nose portion of the forged guard.

As shown on the drawings:

The present invention relates to improvements in agricultural machine cutting structures and more particularly to improvements in mower cutter bar guards, of the forged type, wherein the lips are rigidly secured in place by an improved method for strengthening the lip constructions to minimize the breaking off of the lips at the juncture points of the lips with the nose portions of the forged guard bodies.

The improved guards of this invention are adapted for use on improved cutter bar units such as used on mowers, reapers, and harvesters. The cutter bar unit, on which the improved guards are mounted, is adapted to be connected to an agricultural machine, such as a mower, in a standard manner. In the present showing only a portion of the cutter bar unit is illustrated and described since the present invention is directed more particularly to the cutter bar guards.

In the fragmentary portion of the cutter bar unit illustrated in Figure 1 the reference numeral 1 indicates a reciprocable cutter blade bar which is connected for reciprocable movement by a pitman (not shown) forming a standard part of the cutter bar unit of a mower or other similar type of agricultural machine. Bolted or otherwise rigidly secured side by side in abutting relationship with respect to one another are a plurality of cutter blades or knives 2. The shank portions of the cutter blades or knives 2 are secured to one side of the cutter blade bar 1, with the rear end of each cutter blade projecting beyond the rear face of the cutter bar. The projecting rear ends of the cutter blades 2 are positioned to slide over a continuous one piece sickle wear plate 3, which is substantially of the same length as the guard bar 1. The continuous one piece sickle wear plate 3 is provided with a plurality of spaced transverse notches 4 to provide a notched marginal edge for the continuous wear plate thereby affording an arrangement permitting the wear plate to have the notches therein engaged around the shank portions of guard retaining bolts 5. Longer or double nut type retaining bolts 6 are also provided at selected points in the length of the wear plate 3 and are used for holding a plurality of blade clips 7 in place. Each clip 7 is provided with a base 8 having two spaced openings therein to permit the clip to be secured in place upon the top surface of the wear plate 3 for the purpose of rigidly clamping the continuous wear plate 3 in position upon an apertured guard bar 9 which is carried by the coupling yoke of the mower machine.

Rigidly secured to the guard bar 9 by means of the bolts 5 and 6 are a plurality of adjacently positioned mower guards embodying the improved features of this invention. The improved guards are arranged in parallel relationship as illustrated in Figure 1 and each of said guards comprises a forged guard body 10 having integrally formed on the rear end thereof a flat surfaced mounting shank or anchoring plate 11 having a bolt opening 12 therein. The guard mounting shank 11 is adapted to seat against the underside of the guard bar 9 and is provided with a front bead or flange 13 which when the guard is in position is adapted to seat against the front end of the guard bar 9 to hold the guard when mounted in position at substantially right angles with respect to the front end of the guard bar.

Integrally formed on opposite sides of the rear portion of the guard body 10 are two oppositely projecting spacing arms or fingers 14. The spacing fingers 14 are positioned parallel to the flange 13 and are spaced therefrom providing a guide space for the reciprocating cutter blade bar 1. The two spacing fingers 14 are each provided with a hump or lug 15 on the upper surface thereof. The lugs 15 serve as side stops for the rear or wider end of a ledger blade or plate 16. The ledger blade 16 has the outer or narrow end thereof provided with a central positioning tongue 17 which is adapted to seat in a receiving notch 18 at the outer end of a lower or ledger blade seat 18a formed upon the upper portion of the guard body and permitting the ledger blade to be seated thereon in a flat position with the rear wider end of the ledger blade engaged between the lugs 15 of the spacing fingers 14 as clearly illustrated in Figure 3. Integrally formed on the top of the rearward portion of the ledger blade seat of the guard body is a half round centering stud 19 located to the rear of a centering stud or post 20. The rear portion of the ledger blade 16 is provided with a half round end notch 21 which is centrally located in the rear margin of the ledger blade. The ledger blade 16 is also provided with a centering aperture or hole 22. The ledger blade notch 21, the hole 22 and the centering tongue 17 are centrally aligned longitudinally of the ledger blade thereby permitting the end notch 21 to engage around the stud 19 while the aperture 22 engages over the centering pin 20, while the centering tongue 17 is adapted to seat in the receiving notch 18 provided in a shoulder on the top portion of the guard body. This arrangement accurately aligns and positions the ledger blade 16 on the top of the guard body as clearly illustrated in Figure 3, permitting the ledger blade to be rigidly secured in place with the side cutting edges properly positioned for coaction with the cutting edges of the cutter blades 2 when the cutter bar 1 is reciprocated.

In the construction of the forged types of mower cutter bar guards it is not possible to integrally form the guard lips on the tops of the guard bodies as is done in the construction of malleable iron guards. It is therefore necessary to provide separate forged guard lips which heretofore have been soldered on the tops of guards.

In the present improved guard construction the front end of the guard body is provided with a nose or tip 23 which is curved upwardly leaving a rounded bottom surface which continues downwardly and rearwardly from the front end or tip of the nose to the rear end of the guard body as clearly illustrated in Figure 2.

The top portion of the guard nose 23 is provided with an upper or lip receiving seat 24 terminating at its front end against a shoulder which is provided with a center notch 25. The ledger blade seat 18a and the lip seat 24 are formed at different levels in stepped relationship on the top portion of the guard body 10. Integrally formed centrally upon the lip seat 24 adjacent the notch 18 is an upwardly projecting post or pin 26 the top surface of which is inclined as indicated at 27. As clearly illustrated in Figure 3 the post 26 and the centering notch 25 are centrally aligned longitudinally of the guard and are in alignment with the notch 18 and the centering studs 19 and 20. This arrangement affords a positive alignment for the guard ledger blade 16 and for a guard lip 28. As clearly illustrated in Figure 5 the guard lip 28 is positioned in an inclined plane and is provided with an integral supporting shoe 29 at its forward end to permit the lip to be seated upon the lip seat 24. The forward tapered end of the lip 28 is provided with a centrally located centering tongue 30 which is adapted to engage or seat in the centering notch 25 provided in the nose 23 of the guard as illustrated in Figure 5. The shoe or mounting end 29 of the lip 28 is provided with a central opening 31 the upper end of which is countersunk so that when the shoe or supporting end 29 of the lip is engaged upon the lip seat 24 the centering post or pin 26 projects upwardly through the lip centering opening 31 with the top inclined surface of the post 26 extending above the top surface of the top inclined top face of the lip 28 in the arrangement illustrated in Figure 5.

The mower cutter bar guard is assembled by securing the forged steel lip to the top of the forged body of the guard by projection welding the lip centering post 26, to cause the upper projecting portion of the centering post to be spread or upset to fill the upper countersunk end of the opening 31 to form a retaining head on the post 26 as clearly illustrated in Figure 6 of the drawing. This projection welding of the post 26 rigidly holds the lip 28 properly centered and rigidly secured in place both by the projection welded post 26 and by the centering tongue 30 which seats in the notch 25 of the guard nose.

In the improved mower cutter bar guard construction of this invention it will be noted that improved means are provided for securing and properly centering the ledger blade 16 in position by means of the centering studs 19 and 20 and the centering tongue 17 of the ledger blade. This novel mounting of the lip thus provides a plurality of anchoring means for the supporting end of the lip and greatly reduces any tendency to transverse shearing off of the lip from the guard by transverse strains when the guard is used on a mower cutter bar unit.

It will, of course, be understood that numerous details of construction may be varied through a wide range without departing from the principles of this invention, and it is, therefore, not the purpose to limit the patent granted hereon otherwise than necessitated by the scope of the appended claims.

I claim as my invention:

1. The combination with a harvesting machine guard bar, of guard units secured to the bar and each comprising an apertured mounting plate, a guard body integrally connected with the mounting plate and including an upturned nose, said guard body having the top formed with a ledger blade seat and with a lip seat between the mounting plate and said nose, spacing fingers formed on opposite sides of the rear portion of said guard body, spaced centering studs integrally formed centrally on the rear portion of the ledger blade seat in the longitudinal center plane of the guard body, said ledger blade seat and the lip seat formed with centering notches in the longitudinal center plane of the guard body, a ledger blade secured on the ledger blade seat and having openings to engage over the spaced centering studs, a positioning tongue integrally formed on the front end of the ledger blade and seated in the ledger blade seat notch to assist in centering the ledger blade, a centering post formed on the lip seat between the centering notches, a guard lip seated on the lip seat and having a centering tongue on the mounting end thereof seated in the lip seat centering notch, said lip having a countersunk opening therein for engaging over the centering post for rigidly securing the lip in centered position on the guard body by means of a projection weld filling the countersunk opening, said lip having a portion engaging the front end portion of said ledger blade to retain said blade in seated position on said guard body.

2. The combination with a harvesting machine guard bar, of guard units rigidly secured thereto each unit comprising a guard body having a mounting shank formed on the rear end thereof for securement to the guard bar, a nose on the forward end of the guard body, said nose having a lip centering notch formed in the top thereof, lower and upper seats formed in the top of the guard body to the rear of the nose, said lower seat having a centering notch at the forward end thereof, spaced studs formed on the lower seat in line with the notch at the forward end, an apertured ledger blade secured on the lower seat with the apertures therein engaged over the studs, said ledger blade having a tongue on the front end thereof projecting into the notch at the forward end of the lower seat, a post formed on the upper seat in line with the notches and said studs, a guard lip formed with a supporting shoe seated on the uper seat of the guard body, a tongue formed on the front end of the lip shoe and engaged in the nose notch, said lip shoe having a countersunk opening therethrough engaged over the post and with a projection weld filling the countersunk opening to rigidly hold the lip centered in place over the ledger blade to retain the same in seated position on said guard body.

3. In an agricultural machine cutter bar unit, a guard comprising a guard body formed with an apertured mounting shank at one end and with a nose at the opposite end, a pair of stepped seats formed on the top of the guard body terminating at notches formed in shoulders on the top of the guard body, studs formed on one of the seats, an apertured ledger blade engaged over the studs and seated on the seat having the studs thereon, said ledger blade formed with a projection to engage in one of the notches, a lip seated on the other of said seats and having a projection thereon to engage in another of said guard body notches, said lip having a countersunk opening therein, and a post integral with the guard body and projecting above said other seat, said post positioned to project upwardly through the lip countersunk opening and with a weld filling the opening to rigidly secure the lip in place, said lip having a portion engaging said ledger blade to retain the same in seated position on said guard body.

4. In an agricultural machine cutter bar unit, a guard unit comprising a guard body formed with a mounting shank at one end and with a nose on the opposite end, a pair of stepped seats formed on the guard body, an apertured ledger blade seated on one of said seats, a plurality of studs on said seat projecting through the ledger blade openings, an apertured guard lip seated on the other of said seats and fitting into the guard nose, and a post on said other seat projecting through the lip aperture and with a weld on the post engaging the lip to rigidly secure the same in place over the ledger blade to retain the same in seated position on said guard body.

5. In an agricultural machine cutter bar unit, a guard mechanism comprising a guard body formed with a ledger blade seat and with a notch, a pair of studs projecting upwardly from said seat, a ledger blade seated on said seat and having a pair of openings therein for engaging around said studs, a tongue formed on said ledger blade and projecting into said notch, a lip seated on said guard body, and a projection weld securing the lip to the guard body, said lip having a portion engaging said ledger blade to retain the same in seated position on said guard body.

6. In an agricultural machine cutter bar unit, a guard mechanism comprising a guard body formed with a ledger blade seat and with a notch, a pair of studs projecting upwardly from said seat, a ledger blade seated on said seat and having a pair of openings therein for engaging around said studs, a tongue formed on said ledger blade and projecting into said notch, a lip seated on the guard body and having a countersunk opening therethrough, a post intergral with the guard body and formed of forged metal, and a weld formed on said post to fill the countersunk opening to rigidly secure the lip in place, said lip having a portion engaging said ledger blade to retain the same in seated position on said guard body.

7. A mower machine cutter bar unit including a plurality of guards secured thereto, each of said guards comprising a forged metal body formed with upper and lower seats, a ledger blade seated on the lower seat, a forged post formed on the upper seat, a lip seated on the upper seat and having a countersunk opening therethrough through which the post projects, said post having a weld formed thereon to fill the opening to rigidly hold the lip in place, said lip having a portion engaging said ledger blade to retain the same in seated position on said guard body.

8. In an agricultural machine cutter bar mechanism including a guard unit having a guard body formed with a lip seat and a guard lip seated on said seat and having interengagement means formed on the guard body and the lip to prevent lateral movement therebetween, means for fixedly attaching said guard lip to said guard body comprising an integral post on said body projecting upwardly from said seat, said lip having an aperture engaging about the post with a countersunk portion of the aperture around the free end portion of the post, and a weld formed on the post filling said countersunk aperture portion.

JOSEPH E. NOVAK.

REFERENCES CITED

The following references are of record in the file of this patent:

UNITED STATES PATENTS

| Number | Name | Date |
| --- | --- | --- |
| 105,311 | Crosby | July 12, 1870 |
| 336,473 | Crist et al. | Feb. 16, 1886 |
| 904,547 | Martin | Nov. 24, 1908 |
| 1,363,288 | Swanson | Dec. 28, 1920 |
| 1,629,428 | Zeller | May 17, 1927 |
| 1,793,717 | Pearson | Feb. 24, 1931 |
| 1,876,220 | Gravely | Sept. 6, 1932 |
| 2,127,048 | Powell | Aug. 16, 1938 |
| 2,490,261 | Gable | Dec. 6, 1949 |

FOREIGN PATENTS

| Number | Country | Date |
| --- | --- | --- |
| 24,506 | Great Britain | Nov. 7, 1896 |